United States Patent Office 3,736,279
Patented May 29, 1973

3,736,279
STABLE NONAQUEOUS COMPOSITIONS CAPABLE OF FORMING THERMOSETTING FILMS
Melville J. Camelon, Utica, Stephen C. Peng, Rochester, and David M. Thomson, Warren, Mich., assignors to Ford Motor Company, Dearborn, Mich.
No Drawing. Continuation-in-part of application Ser. No. 82,131, Oct. 19, 1970. This application Apr. 3, 1972, Ser. No. 240,790
Int. Cl. C08f 47/20; C09d 3/48, 3/76
U.S. Cl. 260—21                               16 Claims

ABSTRACT OF THE DISCLOSURE

A copolymer is dissolved in a nonaqueous dispersion consisting essentialy of active ethenic monomers copolymerized in the presence of an alkylated amino resin. Active ethenic monomers of the dispersion are free of functional hydroxy groups and at least one has a functional epoxy group. The copolymer has functional groups capable of reacting with the alkylated amino resin and the epoxy groups during final film curing. Conventional techniques are used to apply the mixture to vehicle bodies which then are heated to drive off the dispersion medium and solvent and cure the remaining ingredients into a glossy, durable thermosetting film.

SUMMARY OF THE INVENTION

This application is a continuation-in-part of U.S. patent application Ser. No. 82,131, filed Oct. 19, 1970, now abandoned, and relates to the subject matter of concurrently filed U.S. patent application Maker et al., Ser. No. 240,789, entitled Nonaqueous Dispersions of Thermoseting Film Forming Polymers, which is a continuation-in-part of U.S. patent application Ser. No. 82,130, filed Oct. 19, 1970, now abandoned.

In addition to the manufacturing difficulties encountered in producing the relatively new nonaqueous dispersions capable of forming thermosetting films, problems also have arisen in achieving proper final film properties. It was difficult, for examle, to obtain smooth, glossy films at relatively low final film thicknesses. Adhesion, cohesion, solvent resistance and hardness of the films also were less than satisfactory.

The particulate nature of the film forming polymers in the nonaqueous dispersions appears to be the primary cause of these difficulties. Achieving a stable dispersion necessitates that the dispersed particles resist coalescence. Exactly the opposite property is desirable, however, after the dispersion has been applied to an article and is being converted into a film.

This invention provides a stable nonaqueous dispersion composition that is capable of forming thermoseting films having excellent final film properties. Compositions of the invention can be stored for considerable time periods prior to use and the final films have gloss, hardness and durability properties suitable for protective and decorative coatings on vehicle bodies and a variety of other articles.

The composition comprises a nonaqueous dispersion consisting essentially of at least two active ethenic monomers copolymerized in the presence of an amino resin dissolved in a nonaqueous medium, and a dissolved copolymer having functional groups capable of reacting with the dispersion. One of the ethenic monomers used to make the dispersion has a functional epoxy group and substantially all of the ethenic monomers forming the particles of the dispersion are free of functional hydroxy groups. The dissolved copolymer can have functional hydroxy, carboxy, epoxy, amide, or methylolated amide groups.

Nonaqueous dispersions useful in the composition can be made according to the disclosure of the aforementioned Maker et al. patent application, the entire disclosure of which is incorporated herein. Briefly, such dispersions preferably are made by dissolving an alkylated melamine-formaldehyde or urea-formaldehyde resin in an aliphatic medium having a distillation range exceeding about 85° C., heating to refluxing temperature, and slowly adding with continuous agitation a mixture of the active ethenic monomers along with a free radical initiator. The monomers copolymerize at the refluxing temperature to form insoluble particles made up of the polymerization product and the resin.

Active ethenic monomers useful in the invention are monomers readily polymerized by free radical initiators. Such monomers preferably have an activating group near the carbon-carbon double bond. Typical activating groups are esterified carboxyl radicals such as those found in methyl acrylate, methyl methacrylate, ethyl acrylate, ethyl methacrylate, butyl acrylate, butyl methacrylate, propyl acrylate, propyl methacrylate, 2-ethylhexyl acrylate, substitutions such as chloride and acetate radicals such as those in vinyl chloride, vinylidene chloride and vinyl acetate; the other double bonds of aromatic monomers such as styrene, alpha methyl styrene and vinyl toluene; cyano radicals such as in acrylonitrile and methacrylonitrile; and amino carboxyl radicals as in acrylamide. Ethenic monomers having less than about 12 carbon atoms react more effectively and produce dispersions having better stability and final film properties. The methacrylic monomers usually can have a larger number of carbon atoms than acrylic monomers.

Useful active ethenic monomers having a functional epoxy group include 2,3-epoxypropyl methacrylate, 2,3-epoxypropyl acrylate, 3,4-epoxybutyl acrylate, epoxidized cyclohexenylmethyl methacrylate, 4-epoxyethyl styrene, 5,6-epoxyhexyl acrylate, 3-phenyl 2,3-epoxypropyl acrylate, 3-phenyl 2,3-epoxypropyl methacrylate and other epoxyalkyl acrylates and methacrylates. The epoxy functional monomer usually makes up about 5 to 40 weight percent of the total ethenic monomer content in the resultant dispersion. Best final film strength, adhesion and gloss are achieved when the epoxy functional monomers make up about 10 to 20 weight percent of the total ethenic monomer content.

Mixtures of several active ethenic monomers are used to produce a combination of final film and dispersion properties. Acrylonitrile preferably forms up to 40 weight percent of the combined ethenic monomers because its dispersions are highly stable. Acrylic and methacrylic acids in amounts no greater than about 5 weight percent of the combined ethenic monomers can be included as built-in catalysts for final film curing. The amount of these acids preferably is kept below 3 weight percent to prevent significant participation in the dispersion forming reactions.

Useful alkylated amino resins include the resins prepared by condensation of an amine and an aldehyde in the presence of an alkanol. Melamine-formaldehyde condensation products having alkyl groups from methanol, ethanol, propanol, butanol and higher alcohols up to and including lauryl alcohol produce excellent final film properties. Alkylated urea-formaldehyde also can be used. These resins must have good tolerance to mineral spirits with the preferred level exceeding about 400–500 as measured by ASTM D1198–55 at 60 percent solids in butanol. Such amino resins usually make up about 10–50 weight percent of the total polymeric dispersion solids. Best final film properties are obtained with thermosetting resins making up about 20–40 weight percent of the total polymeric dispersion solids.

The dissolved polymer is added to the dispersion along with any desired pigments. Functional groups for the dissolved copolymer can be derived from hydroxy functional monomers such as 2-hydroxyethyl acrylate, 2-hydroxyethyl methacrylate, 3-hydroxypropyl acrylate, 3-hydroxypropyl methacrylate, 2-hydroxypropyl acrylate, 2-hydroxypropyl methacrylate; carboxy functional monomers such as acrylic acid, methacrylic acid, itaconic acid, maleic acid, fumaric acid; epoxy functional monomers such as 2,3-epoxypropyl acrylate, 2,3-epoxypropyl methacrylate, 3,4-epoxybutyl acrylate, 4-epoxyethyl styrene, 5,6-epoxyhexyl acrylate, 3-phenyl 2,3-epoxypropyl acrylate, 3-phenyl 2,3-epoxypropyl methacrylate, and other epoxyalkyl acrylates and methacrylates. These functional monomers are copolymerized with methyl acrylate, methyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, 2-ethylhexyl acrylate, 2-ethylhexyl methacrylate, styrene, acrylonitrile, acrylamide, vinyl chloride, vinyl acetate, styrene, vinyl toluene, alpha methyl styrene, or mixtures thereof to produce varying final film properties. The functional monomers preferably make up 10–50 weight percent of the total dissolved polymer in such blends.

Polymerization of the monomers to form the dissolved copolymer can be carried out in an aromatic solvent that is miscible with the dispersion medium of the dispersion. Useful solvents include xylene, benzene, toluene, ethylbenzene, trimethylbenzene, propylbenzene, butanol, 2-ethyl hexanol, 2-ethylhexyl acetate, etc. The dissolved copolymer preferably has a number average molecular weight below about 5000 because the resulting compositions can contain higher solids and can increase resinous flow during application and final film formation. After polymerization is complete, the dissolved copolymer is blended with the nonaqueous dispersion.

Hardness, solvent resistance and acid resistance of the cured films resulting from the compositions of this invention can be improved by adding a curing catalyst that is soluble either in the dispersion medium or the solvent of the copolymer solution. Useful catalysts include organometallic salts such as the naphthenates, octoates, acetates, tallates and neodecanoates of zinc, cobalt, copper, lead, manganese, zirconium, and divalent tin. Such organometallic salts can be dissolved directly into the composition. Other metallic salts can be dissolved first in miscible solvents and then added to the composition. Organic acids such as p-toluene sulfonic acid, monobutyl maleate, butyl acid phosphate, phthalic acid, acetic acid, benzoic acid, stearic acid, and related acids also can be used.

Curing catalysts assist significantly in improving curing time of compositions containing dispersions of alkylated amino resins having higher tolerance to mineral spirits, e.g., a composition containing an alkylated amino resin having a mineral spirits tolerance of about 1500 at 60 percent solids in butanol (ASTM D1198–55) cures in about 30 minutes at about 120° C. with less than about 4 weight percent of curing catalyst. A curing catalyst also can be added to compositions containing dispersions having lower mineral spirits tolerance although satisfactory films usually can be obtained without it.

The solids content of the resulting composition typically includes about 25–95 weight percent of dispersed particles, about 5 to 75 weight percent of the dissolved polymer and up to about 4 weight percent of a catalyst. Compositions having best stability, maximum solids content and capable of producing final films having the best combination of gloss, adhesion and cohesion result from mixtures in which the dispersed particles make up about 50–70 weight percent and the dissolved polymer makes up about 30–50 weight percent of the solids content. Pigments can be added to the compositions to produce paints having total solids of 40 to 60 weight percent.

Small amounts, up to about 20 weight percent, of crosslinking resin can be added to the composition to improve final film properties. Such crosslinking resin is dissolved in the composition and can be an amino resin such as melamine-formaldehyde, urea-formaldehyde, alkylated melamine-formaldehyde, and alkylated urea-formaldehyde; an epoxy resin such as reaction products of bisphenol A and epichlorohydrin, isocyanate containing resins, etc. Useful solvents for the crosslinking resin include miscible aromatics such as xylene, ethylbenzene, benzene, toluene, alcohols such as ethanol, 1-propanol, 2-propanol, butanol, pentanol, etc. The crosslinking resin solution or the polymer solution can be used as a medium for pigment grinding.

Application techniques and final film properties also can be enhanced by adding small amounts of additional solvents that modify composition viscosity and volatility and dispersion coalescence and flow. Typical of such solvents are monobutyl ether of ethylene glycol, an acetate ester of monobutyl ether of ethylene glycol, or butyl cellosolve. Relatively polar solvents of this nature are highly useful in compositions intended for electrostatic spraying.

The compositions of the invention have high solids content at viscosities suitable for application by spraying, roll coating, curtain coating and other techniques. Film forming solids of the compositions can be as high as 60 weight percent with the best combination of stability, application techniques and final film properties resulting from solids contents of about 40 to 60 weight percent. Final film gloss, durability, adhesion and resistance to atmospheric fallout are excellent even at film thicknesses as low as 0.001 inch. Curing can be carried out at relatively low temperatures of about 100–150; a typical curing cycle for metal vehicle bodies is 120° C. for 30 minutes.

Final film curing is believed to result from polymerization between the epoxy and the methylol or alkylated methylol groups of the dispersed particles, the functional groups of the solution polymer and the crosslinking resin to produce a highly crosslinked, thermosetting structure.

DETAILED DESCRIPTION

EXAMPLE 1

Dispersion

An alkylated melamine-formaldehyde condensation product is prepared by mixing 27 weight parts of melamine, 24.3 parts of butanol, 7.5 parts of xylene, 0.045 part phthalic anhydride and 88.3 parts of a solution containing 40 weight percent formaldehyde, 51 weight percent butanol and 9 weight percent water. The mixture is charged into a reactor equipped with a distillation receiver, water condenser, thermometer and stirrer and is heated to refluxing for a period of about 6 hours during which all water is removed. Excess butanol then is removed by vacuum distillation to produce a condensation product having a final viscosity of U (Gardner-Holdt) at 62.5 percent solids and a mineral spirits tolerance of about 1500 according to ASTM D1198–55 at 60 percent solids in butanol.

A reaction flask equipped with a water condenser, thermometer and stirrer is charged with 694 weight parts of the above condensation product, 600 weight parts branched chain aliphatic hydrocarbon liquid having a distillation range of 210–275° F. and 2 parts benzoyl peroxide. The flask and its contents are heated to 100° C. and an acrylic monomer solution consisting of 160 parts methyl methacrylate, 80 parts acrylonitrile, 100 parts butyl methacrylate, 88 parts butyl acrylate, 120 parts 2,3-epoxypropyl methacrylate, 240 parts styrene, 12 parts acrylic acid, 346 parts of the same branched chain aliphatic hydrocarbon liquid and 10.6 parts benzoyl peroxide is added dropwise over a period of 3 hours with constant refluxing and stirring. After addition is complete, the reaction mixture was allowed to agitate at high speed for about 1 hour. A solution of 0.6 part benzoyl peroxide and 20 parts xylene was added and refluxing and stirring were continued for another 2 hours. The resulting product was a stable milky white dispersion.

Solution copolymer

A reaction flask equipped with a stirrer, thermometer, water condenser and addition funnel is charged with 370 weight parts of xylene and heated to refluxing temperature. A mixture of 75 weight parts t-butyl perbenzoate, 345 parts styrene, 75 parts methyl methacrylate, 450 parts butyl methacrylate, 300 parts 2-ethylhexyl acrylate, 300 parts hydroxypropyl methacrylate, 30 parts acrylic acid and 150 parts xylene was added dropwise through the addition funnel over a period of about 5 hours while keeping the temperature at refluxing. Refluxing was continued for an additional hour at which time the monomers had converted essentially completely to copolymer. The resulting copolymer solution has a number average molecular weight of about 3600 and is diluted with 480 parts of xylene to a Gardner-Holdt bubble vsicosity of W at 60 percent solids.

Additional crosslinking resin solution

A solution of a crosslinking resin is prepared by fitting a reactor with a stirrer, condenser, azeotropic water separator and thermometer, and charging the reactor with 1010 parts of butanol, 650 parts of a solution which is 40% formaldehyde, 53% butanol and 7% water, and 210 parts of malamine crystal. One part of acetic acid is added to accelerate the condensation reaction. The mixture is refluxed for two hours, removing the water of reaction continuously from the azeotropic separator. After cooling to 75° C., butanol is removed under vacuum until the solids content is 75 percent. Xylene is added to reduce the solids content to 60 percent.

Pigment

A solution of 4.1 parts of the crosslinking resin solution and 1.3 parts of xylene is blended under agitation with 4.6 parts of a 65 percent nonleafing aluminum paste to form a smooth aluminum pigment base free of agglomerates. A phthalocyanine pigment base is prepared by sand grinding 1.0 part of phthalocyanine blue pigment, 3.8 parts of the crosslinking resin solution, and 5.2 parts of xylene.

Paint composition

Under constant agitation, 47.5 parts of the nonaqueous dispersion are blended with 20.0 parts of the solution copolymer, 5.5 parts of the additional crosslinking resin solution, 3.0 parts of the aluminum pigment base, 3.5 parts of the phthalocyanine pigment base, and 0.5 part zinc naphthenate. Solvent balancing is achieved by adding 6.5 parts of the monobutylether of ethylene glycol and 2.5 parts of the acetate ester of the monobutyl ether of ethylene glycol. Viscosity is adjusted to 20 seconds using No. 4 Ford cup at 80° C. with 11.0 parts of the aliphatic naphtha used in the nonaqueous dispersion. The resulting composition has a solids content of 44 weight percent.

The paint composition is sprayed on a vehicle body and cured at 120° C. for 30 minutes. A glossy, durable thermoset light blue metallic enamel results even at film thicknesses as low as 0.001 inch. The enamel has a Tukon hardness of 10.0 and is highly resistant to solvents and acids. Clear, protective films are produced by omitting the pigments. Omitting the zinc naphthenate produces an enamel having a Tukon hardness of 7.0 with decreased resistance to solvents and acids.

EXAMPLE 2

Pigment

A white pigment base is prepared by sand grinding 6.0 parts of rutile titanium dioxide with 2.5 parts of the solution copolymer of Example 1 and 1.5 parts xylene.

Paint composition

In the manner of Example 1, 36.0 parts of the nonaqueous dispersion of Example 1 are blended with 8.2 parts of the solution copolymer of Example 1, 7.2 parts of the additional crosslinking resin solution of Example 1, 34.5 parts of the white pigment base, and 0.5 part zinc naphthenate. Solvent balancing is achieved by adding 4.5 parts of butyl cellosolve and viscosity is adjusted to 20 seconds using No. 4 Ford cup at 80° F. with 9.1 parts of the aliphatic naphtha. The resulting composition has a solids content of 54 weight percent. Spraying and curing according to Example 1 produces a glossy, durable thermoset white enamel suitable for use on automotive bodies.

EXAMPLE 3

The procedure of Example 2 is repeated except that 0.5 part of the monobutylester of maleic acid is substituted for the zinc naphthenate. Spraying and curing produces a thermoset white enamel having properties similar to the enamel resulting from Example 2.

EXAMPLE 4

An alkylated melamine-formaldehyde condensation product is prepared by mixing 2207 grams of melamine, 2130 grams of butanol, 2 grams phthalic anhydride and 7230 grams of a solution containing 40 weight percent formaldehyde, 51 weight percent butanol and 9 weight percent water. The mixture is heated to refluxing temperature with agitation. At refluxing, the water rich layer of the butanol-water azeotrope is removed and the butanol rich layer is returned. After 820 grams of the water rich layer has been removed, the remaining mixture is concentrated by vacuum distillation at 70° C. by removing 750 grams of solvent. An aliphatic naphtha solvent (750 grams) having a distillation range of 100–155° C. is added. The resulting condensation product has a nonvolatile content of 60 percent, a Gardner Holdt viscosity of Z, and an ASTM D1198–55 tolerance level of 400.

The condensation product is used in the dispersion preparation procedure of Example 1 to produce a milky white dispersion having a solids content of 53 percent and a number 4 Ford cup viscosity of 38 seconds at 25° C.

One hundred grams of the dispersion is mixed with 75 grams of a hydroxy functional acrylic polymer solution consisting of 60 percent solids in xylene. The solids content of the solution is 23 percent styrene, 5 percent methyl methacrylate, 30 percent butyl methacrylate, 20 percent ethyl hexyl acrylate, 2 percent acrylic acid and 20 percent 2-hydroxypropyl methacrylate. Curing a wet layer of the mixture at 120° C. for 30 minutes produces a hard, glossy film that is not dissolved by exposure for 60 seconds to xylene.

Thus this invention provides a thermosetting film forming composition capable of producing paints suitable for vehicle bodies and a large number of other applications. The high solids content coupled with the relatively low viscosity of the compositions and paints permits highly efficient application with minimal evaporation losses and the atmospheric pollution resulting therefrom.

What is claimed is:

1. A thermosetting film forming composition comprising
a nonaqueous dispersion consisting essentially of
at least two active ethenic monomers copolymerized in the presence of an alkylated amino resin in a nonaqueous dispersion medium, each of said ethenic monomers being free of functional hydroxy groups and one of said ethenic monomers having a functional epoxy group, said amino resin having a minimum tolerance to mineral spirits of about 400 according to ASTM D1198-55, and a solution of a copolymer having functional groups capable of reacting with said dispersion, said solution being miscible in said dispersion medium.

2. The composition of claim 1 in which the functional groups of the solution copolymer are hydroxy, carboxy or epoxy groups.

3. The composition of claim 2 in which the solution copolymer has a number average molecular weight of less than about 5000.

4. The composition of claim 3 comprising a final film curing catalyst, said curing catalyst being an organometallic salt or an organic acid, said curing catalyst being soluble in the dispersion medium of the dispersion or the solvent of the copolymer solution.

5. The composition of claim 4 comprising an additional crosslinking resin dissolved in the composition, said crosslinking resin consisting essentially of an amino resin dissolved in a solvent miscible with said dispersion medium.

6. A composition of claim 5 having a film forming solids content of about 40 to 60 weight percent, said dispersion supplying about 25-95 weight percent and said polymer solution supplying about 5-75 weight percent of said film forming solids.

7. The composition of claim 6 in which the dispersion supplies about 50-70 weight percent and the polymer solution supplies about 30-50 weight percent of said film forming solids.

8. The composition of claim 1 in which the solution copolymer has a number average molecular weight of less than about 5000.

9. The composition of claim 1 comprising a final film curing catalyst, said curing catalyst being an organometallic salt or an organic acid, said curing catalyst being soluble in the dispersion medium of the dispersion or the solvent of the copolymer solution.

10. The composition of claim 1 comprising an additional crosslinking resin dissolved in the composition, said crossliking resin consisting essentially of an amino resin dissolved in a solvent miscible with said dispersion medium.

11. The composition of claim 1 having a film forming solids content of about 40 to 60 weight percent, said dispersion supplying about 25-95 weight percent and said copolymer solution supplying about 5-75 weight percent of the film forming solids.

12. The composition of claim 1 in which the dispersion supplies about 50-70 weight percent and the copolymer solution supplies about 30-50 weight percent of the film forming solids.

13. A process for forming a thermosetting film comprising copolymerizing two active ethenic monomers in the presence of an alkylated amino resin dissolved in a nonaqueous dispersion medium to produce a polymerization product insoluble in said dispersion medium, said polymerization product and said dispersion medium forming a nonaqueous dispersion, one of said active ethenic monomers having a functional epoxy group and both of said active ethenic monomers being free of functional hydroxyl groups, copolymerizing at least two monomers in a solvent to produce a solution of the resulting copolymer, said solvent being miscible with said dispersion medium, said solution copolymer having functional groups reactive with the polymerization product of the dispersion, blending the copolymer solution with said nonaqueous dispersion, applying a film of the resulting composition to an article, and curing the film.

14. The process of claim 13 comprising adding a crosslinking resin solution to the blended solution-dispersion, said resin solution being miscible with said blended solution-dispersion.

15. The process of claim 13 comprising copolymerizing the active ethenic monomers during refluxing of the dispersion medium.

16. The process of claim 15 in which the solution copolymer has hydroxy, epoxy, carboxy, amide, or methylated amide functional groups.

References Cited

UNITED STATES PATENTS

| | | | |
|---|---|---|---|
| 3,317,635 | 5/1967 | Osmond | 260—34.2 |
| 3,419,515 | 12/1968 | Schmidle et al. | 260—33.6 |
| 3,433,753 | 3/1969 | Farkas et al. | 260—33.6 |
| 3,514,500 | 5/1970 | Osmond et al. | 260—34.2 |
| 3,532,662 | 10/1970 | Ansdell | 260—34.2 |

DONALD E. CZAJA, Primary Examiner

R. W. GRIFFIN, Assistant Examiner

U.S. Cl. X.R.

117—132 B, 132 BF, 161 LN, 161 ZB; 260—33.6 EP, 33.6 R, 34.2, 851, 856